Nov. 12, 1929.　　　A. O. AUSTIN　　　1,735,561
FITTING FOR INSULATORS
Filed July 2, 1926　　　2 Sheets-Sheet 1
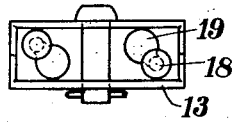
Fig. 3
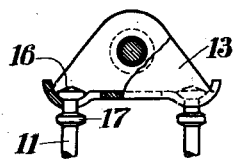
Fig. 4
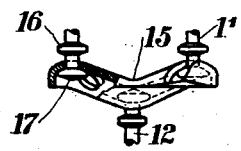
Fig. 6
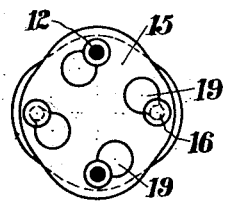
Fig. 5
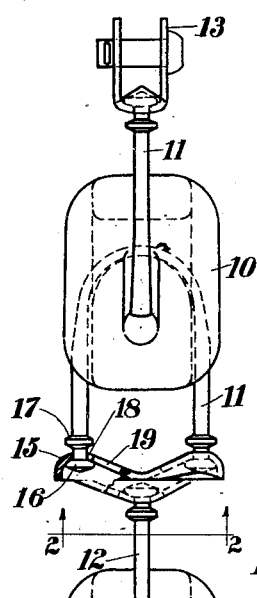
Fig. 1
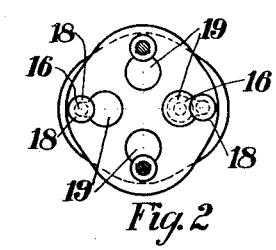
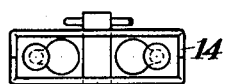
Fig. 7
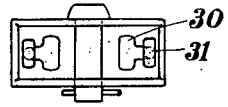
Fig. 8
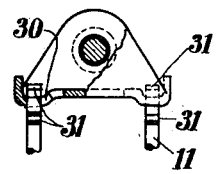
Fig. 9
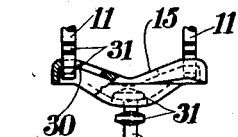
Fig. 10
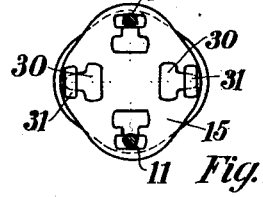
Fig. 11
Inventor
Arthur O. Austin
By Nissen & Crane
Attorney

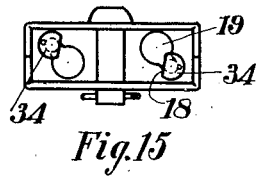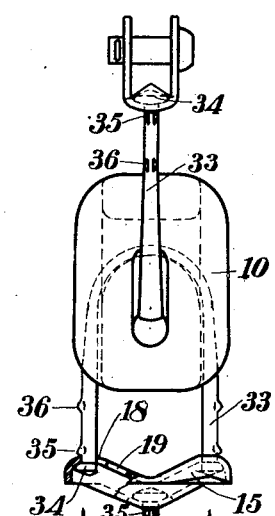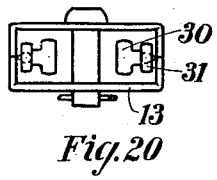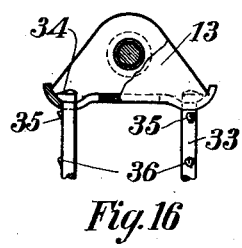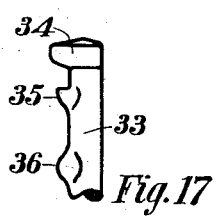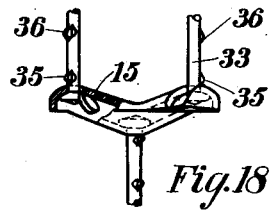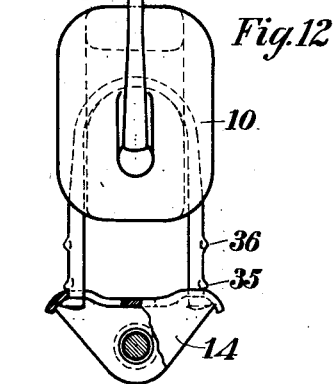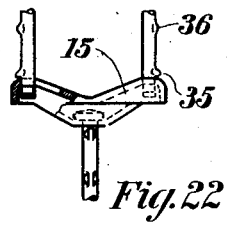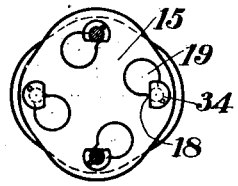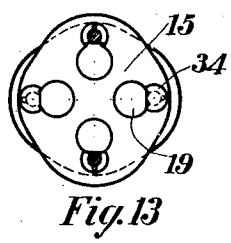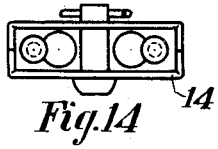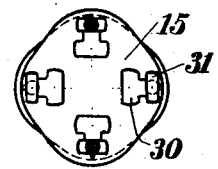

Patented Nov. 12, 1929

1,735,561

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

FITTING FOR INSULATORS

Application filed July 2, 1926. Serial No. 120,089.

This invention relates to fittings for coupling up insulators such as ring type, disc or other insulators requiring interlinked fittings and has for its object the provision of fittings of the class named that shall be of improved construction and operation and that shall be economical to manufacture, easy to install and adapted for economical and convenient transportation. Other objects will appear from the following description.

The invention is exemplified in the combination and arrangement of parts shown in the accompanying drawings, and described in the following specification and it is more particularly pointed out in the appended claims.

In the drawings—

Fig. 1 is an elevation of an insulator assembly embodying the present invention.

Fig. 2 is a section on line 2—2 of Fig. 1.

Fig. 3 is a plan of a modified form of end fitting.

Fig. 4 is an elevation and part section of the fitting of Fig. 3.

Fig. 5 is a view similar to Fig. 2 of a modification.

Fig. 6 is a part elevation and part section of a modified form of central fitting.

Fig. 7 is an end view of an end fitting shown in Fig. 1.

Figs. 8, 9, 10 and 11 are similar to Figs. 3, 4, 6 and 5 respectively showing a further modification.

Figs. 12, 13 and 14 are similar to Figs. 1, 2 and 7 respectively showing another modification.

Figs. 15, 16, 18 and 19 are similar to Figs. 3, 4, 6 and 5 respectively showing another modification.

Fig. 17 is a view of the end of one of the legs of a U-link.

Figs. 20, 21, 22, and 23 are similar to Figs. 3, 4, 6 and 5 respectively showing still another modification.

This invention relates particularly to fittings or attachments for coupling up or attaching high or low voltage insulators, particularly those having interlinked metal parts. The invention provides an efficient connection which permits the attaching of the insulator or series of insulators to supports or permits the coupling up of a series of insulators, providing a safe mechanical connection and one of considerable strength considering the size and weight of the parts used.

The invention also provides fittings or attachments which may be readily and cheaply formed. It also provides fittings or attachments which may be readily attached or detached as desired and at the same time locking means are provided so that parts may not become detached in service or in handling before erection.

In Fig. 1 is shown a series of insulators 10 having interlinked U shaped fittings 11 and 12 and end fittings 13 and 14. A warped fitting 15 is used for attaching links in successive insulators together. The construction is such that while the fittings may be made of forgings or castings they can generally be made of pressed steel or copper or other suitable metal.

The warped fitting 15 as shown in Fig. 1 comprises a metal plate having openings therethrough for receiving the ends of the U bolts 11 so that the planes of the U bolts are at right angles to each other. The portions of the plate to which the U bolts are attached are offset from the plane of the plate in the direction of the force exerted by the U bolts giving the warped shape to the fitting as illustrated. The edges of the plate are bent away from the U bolts to provide strengthening members and stop flanges to limit outward movement of the ends of the U bolts.

In connecting up an insulator, the U shaped members 12 are threaded through the usual openings in the insulator. These members may be partly or entirely bent into U form before inserting in the insulator, depending upon the design of the insulator. In some cases it is necessary to give the U shaped fittings a further bend after inserting in the insulator for if they are given the full amount of bend in the first instance, the ends will have to be spread to allow threading through the hole in the insulator. After the U shaped fittings 11 and 12 are threaded through the insulator, they may then be inserted in the intermediate plate 15 and into the attachments 13 and 14.

A plan of the intermediate or warped fitting 15 is shown in Fig. 2. This fitting consists of a bent or warped plate bent in the direction of the force exerted by the U bolts so that a considerable component of the force set up in the metal plate will be in the general direction of the web of the plate. This permits of great strength for light sections and makes an attachment which may be readily formed.

The U shaped fittings may be made in a variety of forms. Fig. 2 shows a section where the fittings have round heads 16 and 17 spaced apart although other shapes may be used, the essential being that the U bolts have two different sized sections adjacent each other so that the smaller section will permit entry into a slot 18 in the fitting and the larger section will prevent withdrawal. The U shaped fitting is first threaded through the insulator. The head 16 of the fitting is then inserted in the opening 19 of the warped plate and then moved outward into the small slot 18 which connects with the larger opening 19. In the form shown, one head or enlarged section at one end of the U bolt will be on either side of the warped plate. The other end of the U bolt will then be sprung inwardly so that the head will take the position shown in broken lines in Fig. 2 allowing it to enter the enlarged opening. Usually the spring in the fitting is ample to throw the end of the fitting outward when pressure drawing them together is released. Since the fitting has two heads or enlarged portions, one will be on either side of the plate and since the small slot connecting with the large opening is smaller than the head on the fitting, the head cannot be withdrawn. Since the spring in the bolt holds the fitting outward, it cannot be disengaged. While the projection 17 can be dispensed with in some cases, it will be found that the tilting of the fitting without such projections in some cases will permit the link to become disengaged and the insulators will not be held in proper relation. With the arrangement of parts shown, insulators are held in proper position at all times before installation so that when the load or tension is applied to the insulators, the parts will drop into proper relation. The parts are so made that the inclination of the slot 18 connecting with the larger opening 17 tends to throw the ends of the fitting outward toward the small end of the opening. The warp or deflection of the plates under heavy loads is also such that the tendency will be to throw the bolt more tightly into the end of the small slot, thus insuring that the fitting will not become detached.

Where the fittings are very stiff, it is usually advisable to flatten a portion of links 12. Where this flattening is located in the portion in contact with the insulator, an increased bearing area is provided. For very heavy work the links are frequently coated with lead or other material which will cushion or take care of any irregularity between the link and the porcelain or dielectric.

It is not necessary that the U shaped members and slots in which they engage have the form or arrangement shown in Fig. 1 and Fig. 2. Where the fittings are very stiff, an arrangement shown in Figs. 3 and 4 and Figs. 5 and 6 may be used.

In Fig. 3 and Fig. 4 the enlarged portion of the opening 19 and the small section of the slot 18 are placed at an angle to a line running through the center of the fitting in final resting position. Either one or both openings may have this arrangement. This arrangement does not require the U shaped members to be sprung in so far before they will enter the holes 19. Figs. 5 and 6 show an arrangement of the openings of the warped plate similar to that shown in Figs. 3 and 4 for the end fitting.

It is evident that one of the openings may be placed on a radial line and the other at an angle. As the head of the bolt can enter the openings placed on a radial line and move outward, it is then only necessary to spring the other end of the bolt in a slight distance before it will enter the opening placed at an angle.

Figs. 8 and 9 show T shaped slots 30 in the end fitting for receiving T heads 31 on the U bolts 11.

Figs. 10 and 11 show similarly shaped slots and heads for the center fitting.

In the form of the invention shown in Fig. 12 the U shaped links 33 thread through the insulators 10 and are not only provided with heads or enlarged portions 34 but have projections 35 and 36 on the outward side of the link or U shaped member. The warped plate 15 has holes 19 connecting with smaller section 18 as in the form shown in Figs. 1 and 2. While the holes permit the entry of the head of the link 33, the smaller section will not permit the head to be drawn through. The links or U shaped members are threaded through the insulators as previously described and the ends pressed inward so that the heads will pass through the enlarged hole 19 in the warped plate or the enlarged holes of the end attachments.

The links are preferably made of material which will have some resiliency so that the bolts will tend to spring outwardly and enter the smaller sections of the openings in the plate or in the end fittings 18. It is evident, that if the bolts were permitted to slide endwise through the plate it might become disconnected or out of place. In order to prevent this a small projection 35 is formed by pressing in the side of the bolt or by other means.

When the bolt springs outwardly against the end of the slot or opening 18 in the plate, the projection 13 will prevent its slipping through.

In Fig. 17 the projection 35 located near the head 34 has a square shoulder or face on the side next the head 34 and a tapered shoulder on the opposite side. This permits the bolt to be sprung into operating position readily and prevents it slipping out of position after once in place. The inclined face will deflect the bolt inwardly when longitudinal tension is applied to the fittings allowing the fitting 15 to slip over the shoulder 35 and the bolt to spring into place. In some cases it is desirable to couple up the insulators ready for installation before they are sent to the place where they are to be installed. The assembled fittings if extended however, take up much room. In order to economize space as much as possible the assembled fittings may be compacted by projecting the U shaped members through the fittings to bring the fittings back of the second projections 36 and adjacent the insulators. In this position the plate 15 and projections 36 will act to hold the insulators close together.

In order to take up as little space as possible the bolts or U shaped fittings 33 may have to pass the porcelain of the adjacent insulators. Since the inner portions of the heads of the bolts usually do little or no good this portion is sheared off as shown in Fig. 17. Where the insulators are made up in this way they will be held in compact form for transportation but as soon as tension is applied to the ends of the assembled string the bolts 33 will assume their normal operative positions and the assembly will be automatically locked in place by the lugs 35.

The arrangement provides a strong fitting at low cost and one which may be made up or detached with ease. The fittings are, of course, suitable for any of the ring type insulators, whether of the disc or string type.

The projections 35 for holding the parts in compacted, assembled relation may be applied to fittings in which the restricted portions of the openings are not radially disposed as illustrated in Figs. 15, 16, 18 and 19. This form of the invention is also applicable to T slots and T heads as shown in Figs. 2 to 23 inclusive.

I claim—

1. A fitting comprising a yoke member and a U bolt, said yoke member having a pair of openings therethrough provided with enlarged and restricted portions, the ends of the U bolt being of a size to enter said restricted portions but having heads thereon of a size to be retained by said restricted portions but to pass through said enlarged portion, said U bolt having spring tension therein tending to hold the ends thereof into said restricted portions when in engagement with the openings of said yoke.

2. An insulator fitting comprising a U bolt, a yoke having openings therein for receiving the ends of said U bolt, said openings having enlarged and restricted portions, said U bolt having heads hereon of a size to pass through said enlarged portions but to be retained by said restricted portions, the faces of said yoke for engaging said heads being inclined relative to the direction of said U bolt to direct the ends of said U bolt into said restricted portions, when tension is exerted on said U bolt.

3. An insulator fitting comprising a U bolt having a head on each end thereof, a yoke having spaced openings provided with enlarged and restricted portions of a size to permit said heads to pass through the enlarged portions but to prevent said heads from passing through said restricted portions, said heads being normally spaced a greater distance apart than the enlarged portions of said openings to require the ends of said U bolts to be forced together to bring said heads into registration with said enlarged openings and to place said U bolt under stress tending to spring said U bolt into said restricted portions.

4. An insulator fitting comprising a U bolt having a head on each end thereof, a yoke having spaced openings of a size to receive said heads but having restricted portions extending from said openings of a size to prevent said heads from passing therethrough, the ends of said U bolts being normally spaced apart a different distance from that of said openings to require said U bolt to be placed under stress when said heads are passing through said openings, the stress on said U bolt being of a direction tending to spring said U bolts into said restricted portions.

5. A fitting for insulators comprising a U bolt having a head on each end thereof, a yoke having spaced openings of a size to receive said heads, said U bolt being placed under stress when the heads are brought into registration with said openings, the stress thereon tending to force said U bolts into restricted portions communicating with said openings in which the heads of said U bolts are retained, said yoke having inclined contact faces for said heads supplementing the action of the stress on said U bolt tending to move said U bolt into said restricted portions when tension is placed on said U bolts.

6. An insulator fitting comprising a pair of U bolts, a plate for detachably connecting the ends of said U bolts, said plate having two pairs of openings extending transversely therethrough for receiving the ends of said U bolts respectively, each opening having restricted portions communicating therewith and said openings arranged to permit the ends of said U-bolts to be projected through said plate transversely of said plate, said U bolts having heads thereon of a size to pass through said openings but to be retained by said restricted portions, said plates being warped to offset said openings in the direction of the U bolts connected therewith, the edges of said plate being bent over to provide reinforcing flanges.

7. In combination a pair of insulators having U bolts threaded therethrough, a yoke having openings therein for receiving the ends of said U bolts, said U bolts being movable longitudinally through said openings to bring said insulators close together and means for releasably retaining said U bolts in position with their ends projecting through said yoke to retain said insulators in compacted relation.

8. An insulator fitting comprising a yoke having spaced openings therethrough, a U bolt having the ends thereof arranged to engage the ends of said openings and having the heads thereon for retaining the ends of said U bolt in said openings, said yoke being movable along said U bolt in a direction away from the ends thereof and projections on said U bolt movable past said openings when the legs of said U bolt are sprung relative to each other, said projections being arranged to engage the edges of said opening and releasably retaining said yoke in positions spaced from the ends of said U bolt.

9. An insulator fitting comprising a U bolt, a yoke having openings therethrough for receiving the ends of said U bolt, said U bolt having lugs thereon spaced from the ends of said U bolt for yieldingly engaging the edges of said openings to retain said yoke in position spaced from the ends of said U bolt, the legs of said U bolt being yielding to permit said lugs to pass said yoke when tension is exerted on said U bolt.

10. A fitting for an insulator comprising a sheet metal plate having two pairs of transverse perforations therethrough, each perforation having a restricted slot extending therefrom and communicating therewith, the portions of the plate containing the respective pairs of perforations being offset in opposite directions transversely of the plate.

11. An insulator fitting comprising a plate having a pair of perforations extending transversely therethrough, each perforation having a slot extending outwardly therefrom and communicating with said perforation, a U-bolt having headed ends extending through said perforations and engaging said slots, the portions of said plate having said slots therein being offset transversely of said plate toward the side thereof at which said U-bolt extends.

12. An insulator fitting comprising a plate having spaced perforations therethrough and slots extending outwardly and laterally from said perforations and communicating therewith, and a U-bolt having the legs thereof headed and extending through said perforations and engaging said slots.

13. An insulator fitting comprising a plate having two pairs of perforations extending therethrough and outwardly and laterally extending slots communicating with each of said openings, U-bolts disposed at opposite sides of said plate and having headed ends engaging said slots, the portions of said plate engaged by the ends of said U-bolts being offset transversely of said plate in the direction of the U-bolt engaged thereby.

14. An insulator fitting comprising a plate having a pair of openings therethrough each provided with an outwardly extending slot communicating therewith, a U-bolt having headed ends engaging said slots, each end of said U bolt having two projections thereon spaced different distances from the headed end for engaging said plate to retain said plate in different positions on the legs of said U-bolt.

15. In combination, a pair of insulators, U-bolts threaded through said insulators and having headed ends, a yoke for connecting the ends of said U-bolts, said yoke comprising a plate having two pairs of perforations therethrough each provided with an outwardly extending slot communicating therewith, said slots being engaged by the headed ends of said U-bolts, said ends being retained in said slots by the resiliency of said U-bolts, and two projections on the outer side of each leg of said U-bolt spaced different distances from the head thereof for retaining said U-bolts in different relations with said yoke to permit compacting of said insulators for transportation and separation thereof for use.

In testimony whereof I have signed my name to this specification on this 29th day of June A. D. 1926.

ARTHUR O. AUSTIN.